Patented Sept. 5, 1933

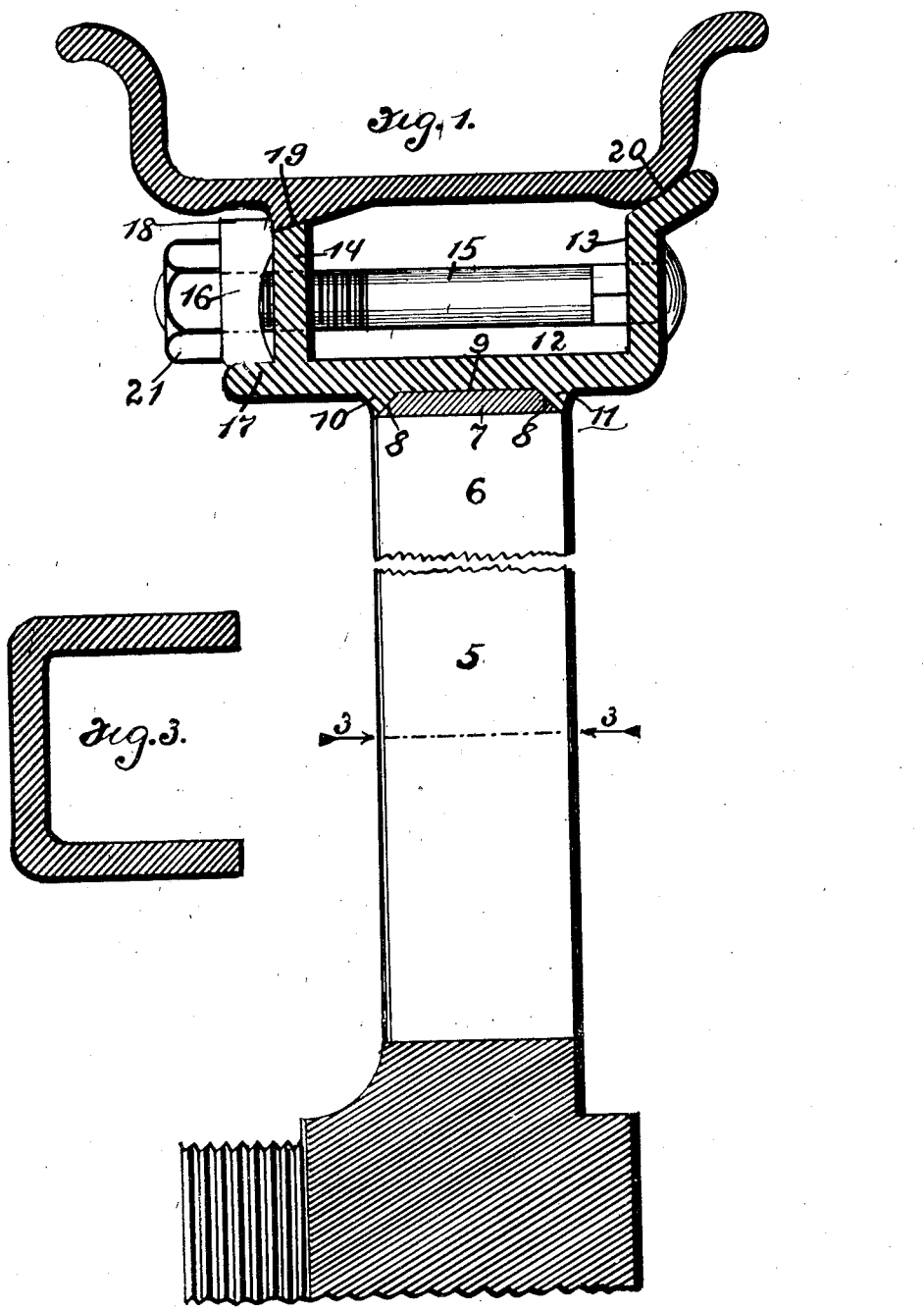

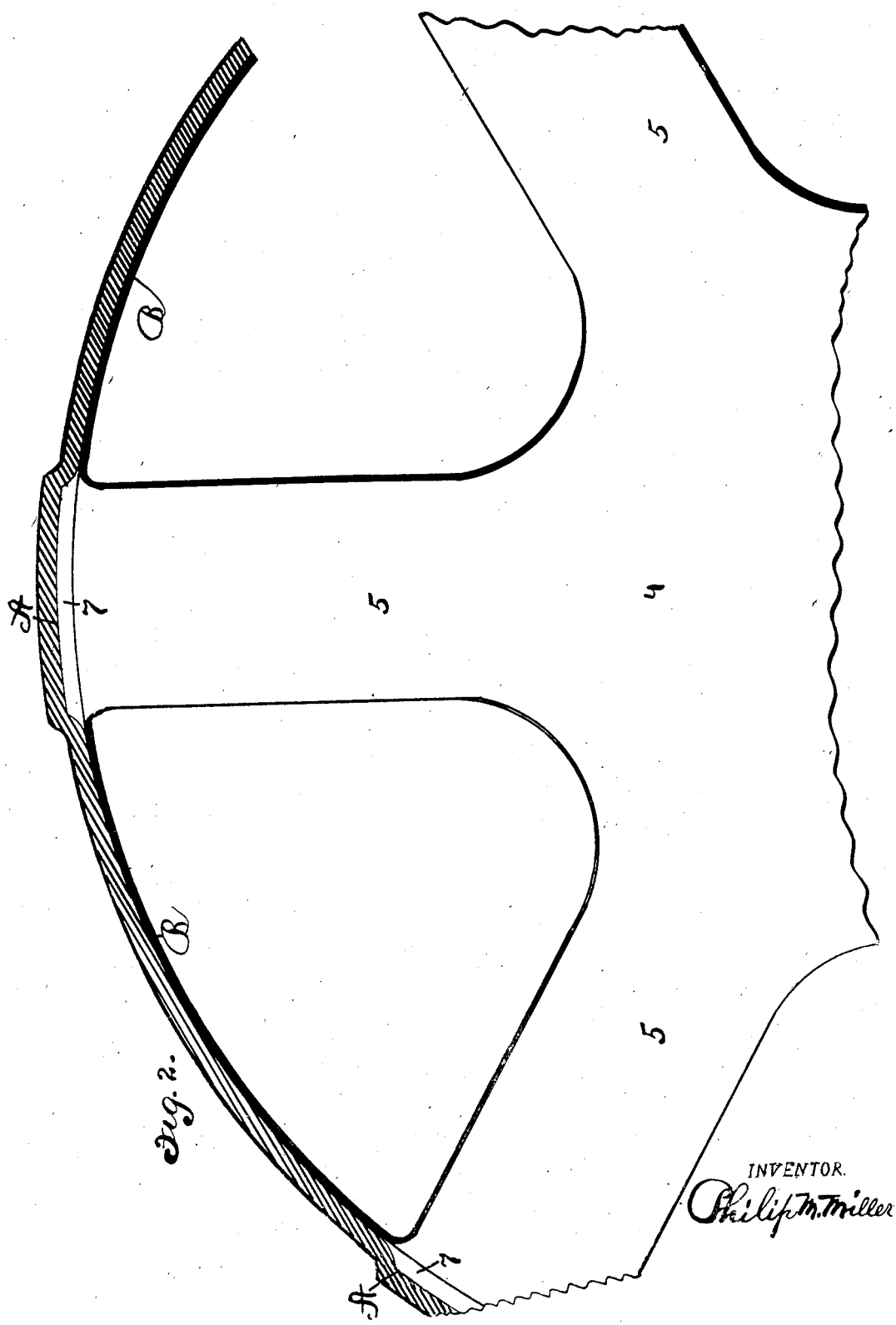

1,925,594

UNITED STATES PATENT OFFICE 1,925,594

METHOD OF FORMING VEHICLE WHEELS

Philip M. Miller, Youngstown, Ohio, assignor to Miller Devices Inc., New York, N. Y., a corporation of New York Application August 21, 1929. Serial No. 387,508

3 Claims. (Cl. 29—159.03)

This invention relates to a method of making all metal artillery wheels, and the principal object of the same is to provide a simple method of rigidly fixing a channeled rim to the outer heads of the spokes of a spider member, the spider arms preferably being of open type and U-shape in cross section. The resultant wheel is light and strong in construction and has improved features at the joints between the ends of the spokes and fixed rim tending to prevent the formation of cracks or other defects at or around the jointed ends of the spokes.

Other objects and advantages of the invention will be appreciated from the description of the accompanying drawings, wherein;

Figure 1 is a view in cross section of a wheel constructed in accordance with my method and carrying a demountable rim;

Fig. 2 is a portion of the wheel in side elevation, showing the method of attaching the rim to the ends of the spokes; and, Fig. 3 is a cross section of Fig. 1 taken on the line 3—3 as indicated by the arrows.

The wheel construction comprises a spider 4 having radiating U-shaped spokes 5 extended from the central or hub portion. The outer ends or heads 6 of the spokes are each provided with an enlarged head 7 having side tapered faces 8. Each enlarged head 7 is engaged in a channel 9 formed by the side beads 10 and 11 on the inner periphery of the base of the rim 12. The rim is provided with parallel side walls 13 and 14 which are merged with the intermediate base thereof. A plurality of bolts 15 are fixed in the walls 13 and 14, to provide locking means in connection with the clamps 16, which are positioned on the ledge 17 extended from the outer side of the rim. The opposite end 18 of each clamp 16 is in engagement with the side of the bead of the demountable rim, which is held in rigid engagement on the bearings of the fixed rim as shown at 19 and 20, and the nuts 21 each is in threaded engagement with a lock bolt to lock the demountable rim on the fixed rim 12.

In order to provide the channel 9 on the inner periphery of the base of the fixed rim 12, the rim is preferably hot-rolled at the mill in the form as shown in cross section, and cold-rolled at the manufacturer's plant to provide an annulus. The ends of the annulus are welded together to form a continuous ring having parallel side walls 13 and 14. The annulus in solid form is then forced on the enlarged heads 7 of the spider spokes in a manner such that the annulus is positioned on the heads 7 of the spokes with the faces of the beads 10 and 11 over the tapered faces 8 of the heads 7. When both constructions are in the position just described they are then placed in a suitable press or shrinker with the operative members thereof in the channel of the fixed rim and compressed radially to the extent that the base portion between two heads 7 of the spokes is depressed inwardly with reference to the base portion which is over the head of each spoke as clearly shown in Fig. 2 at A and B, thereby positioning each head 7 in the channel 9 which is in longitudinal alignment, and channel A which formed in cross section with respect to the base of the rim.

With the formation of the longitudinal channel 9 and transverse channel A each head 7 is in rigid engagement with the rim 12, and lateral and circumferential creeping of the rim is prevented in relation to the heads of the spokes of the spider.

From the foregoing description it is understood that the circumferential diameter of each channel 9 is unequal to the diameter of the base between two spokes, that is the diameter of the base of the rim between two spokes is less than the diameter of the base which is over the heads of the spokes.

With the foregoing description of the principles of the invention, it is understood that the latter is susceptible to a limited range of modification, variation and substitution without departing from the spirit and scope of the claims.

Having thus described my invention, what I desire to secure by Letters Patent is:

1. In the manufacture of metal wheels for motor vehicles the method which consists in forming a spider member having free spoke ends, positioning an annular rim on said spoke ends, and compressing the rim radially between the spokes to cause the ends of the latter to form depressions in the rim and socket themselves in said depressions.

2. In the manufacture of metal wheels for motor vehicles, the method which consists in forming a spider member having free spoke ends, forcing an annular rim of less diameter than the diameter of the spider member onto said spoke ends, and compressing the rim radially between the spokes to cause the ends of the spokes to form depressions in the rim and socket themselves in said depressions.

3. In the manufacture of metal wheels for motor vehicles, the method which consists in forming a spider member having free spoke ends, tapering said ends, positioning an annular rim having a channeled base on the spider with the channeled base thereof engaging said ends, and compressing the rim radially between the spokes to form depressions in said base and socket the spoke ends in said depressions.

PHILIP M. MILLER.